(12) United States Patent
Reyes

(10) Patent No.: US 11,697,226 B2
(45) Date of Patent: Jul. 11, 2023

(54) MOLD EXTRACTOR

(71) Applicant: Honeywell Federal Manufacturing & Technologies, LLC, Kansas City, MO (US)

(72) Inventor: Joseph Reyes, Gladstone, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 17/517,877

(22) Filed: Nov. 3, 2021

(65) Prior Publication Data
US 2023/0137786 A1 May 4, 2023

(51) Int. Cl.
*B29C 43/50* (2006.01)
*B29C 37/00* (2006.01)

(52) U.S. Cl.
CPC .......... *B29C 43/50* (2013.01); *B29C 37/0003* (2013.01)

(58) Field of Classification Search
CPC ................ B29C 43/50; B29C 37/0017; B29C 2043/3628
See application file for complete search history.

(56) References Cited

U.S. PATENT DOCUMENTS 2,466,407 A * 4/1949 Ragnar ................... B29C 43/00
425/62
6,652,260 B2 * 11/2003 Nelson ................ A61F 2/30942
425/436 RM \* cited by examiner

*Primary Examiner* — Galen H Hauth
(74) *Attorney, Agent, or Firm* — Hovey Williams LLP

(57) ABSTRACT

A mold extractor for separating a molded part from a mold portion following a molding process, and a method of using the same. The mold extractor includes a mold holder that removably couples to the mold portion, a retainer that abuts a portion of the molded part and that surrounds the mold holder such that a cavity is provided between the mold holder and the retainer, and an extraction rod engaged with the mold holder and the retainer and spanning the cavity between the mold holder and the retainer. The mold extractor is set up to reduce a distance between the mold holder and the retainer along the extraction rod such that the mold holder translates into the cavity and imparts a force on the mold portion sufficient to extract the mold portion from the molded part.

18 Claims, 8 Drawing Sheets

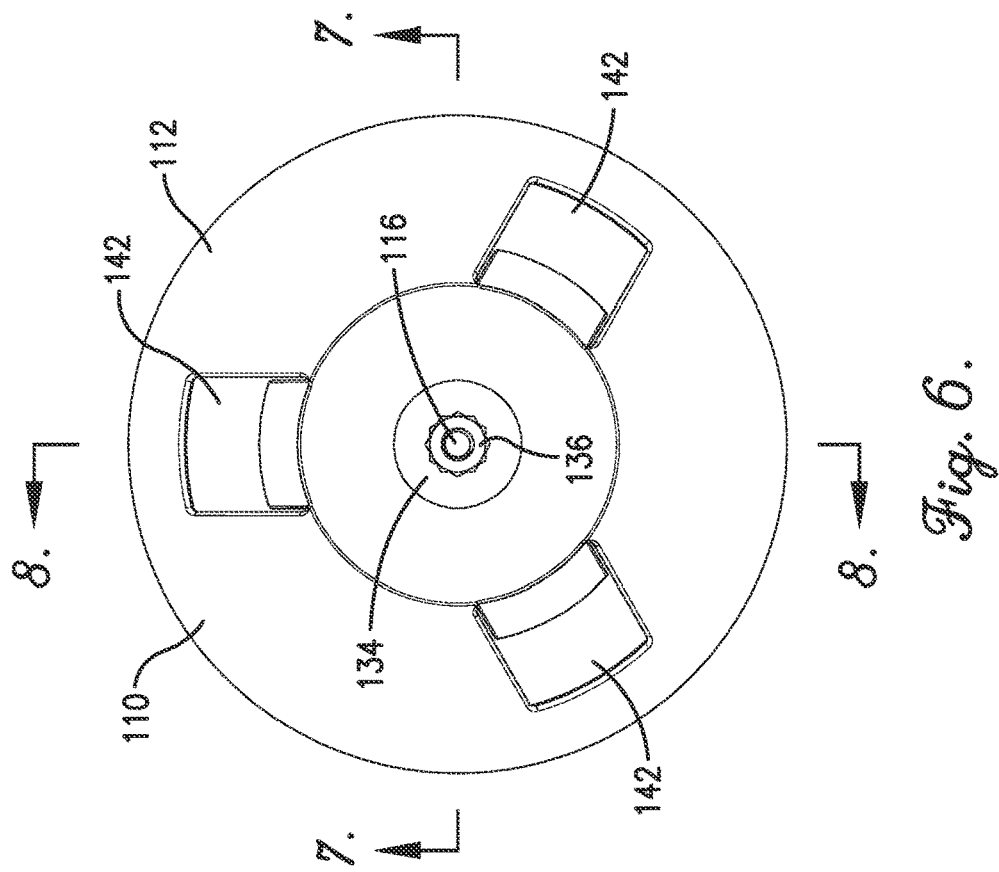
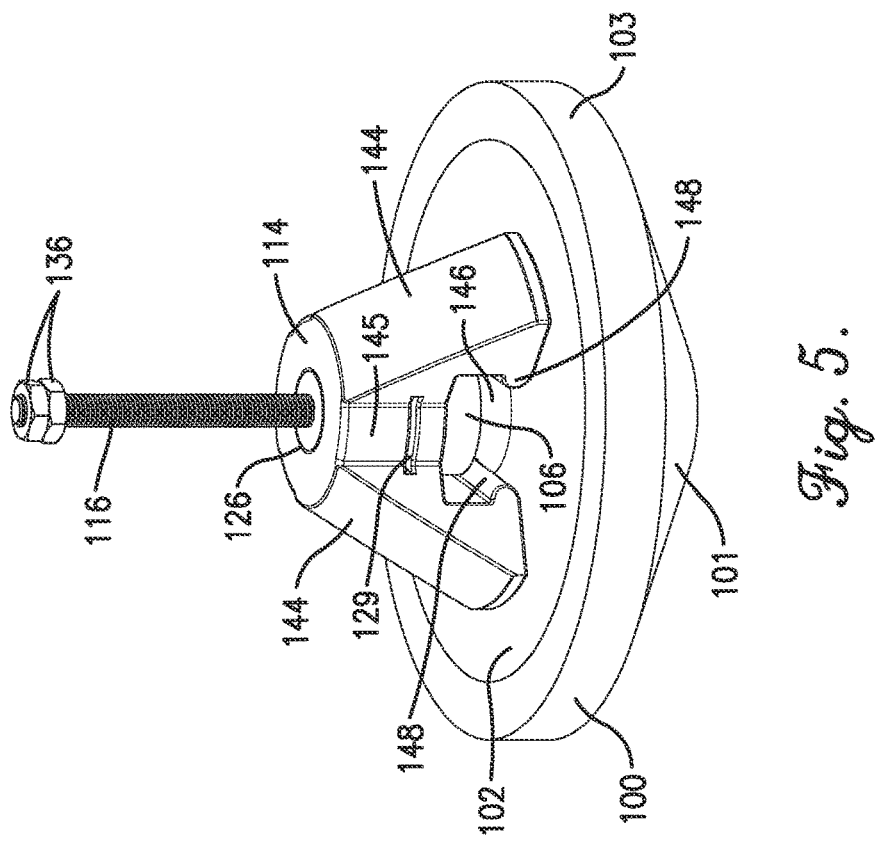
Fig. 6.
Fig. 5.

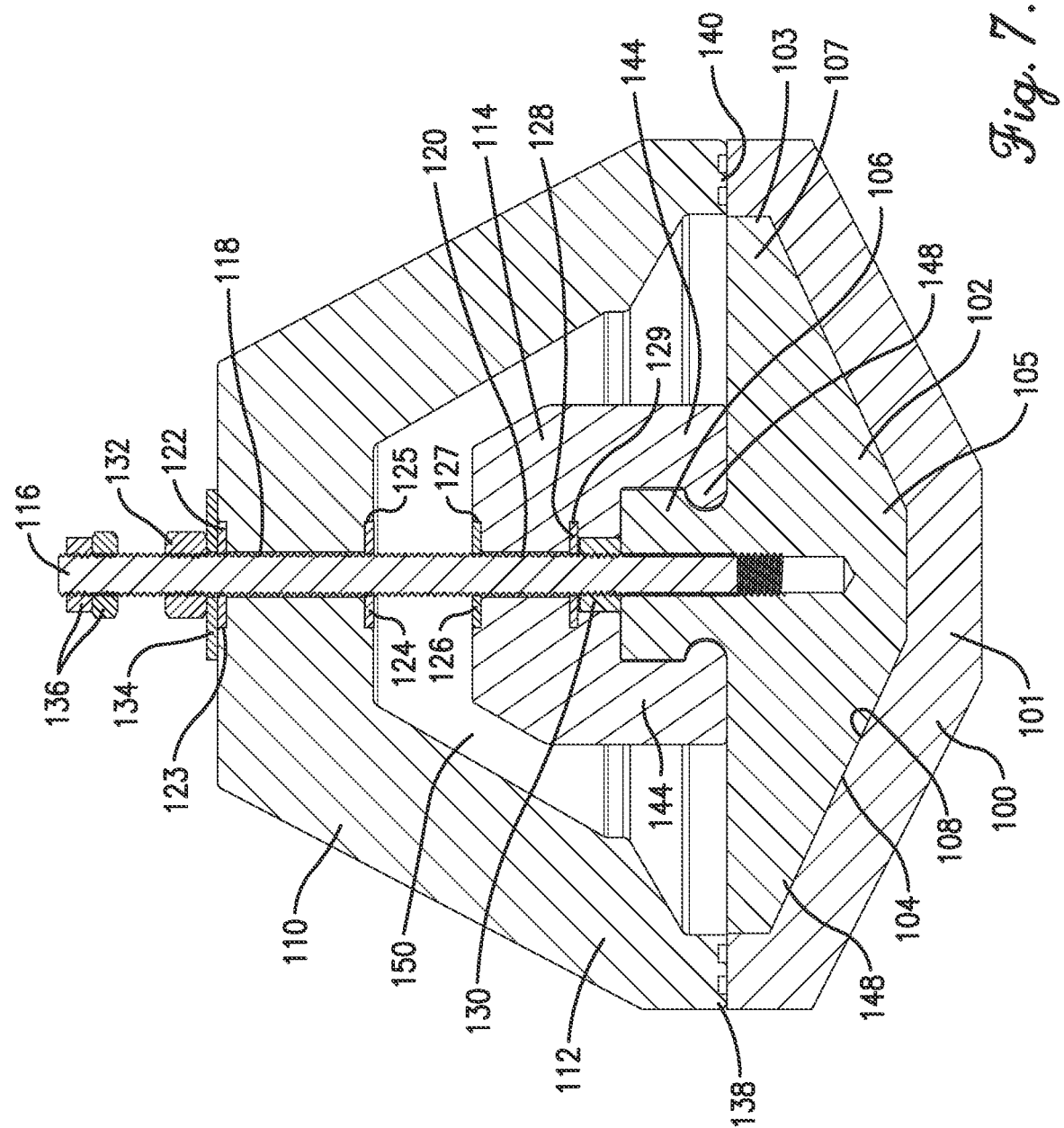

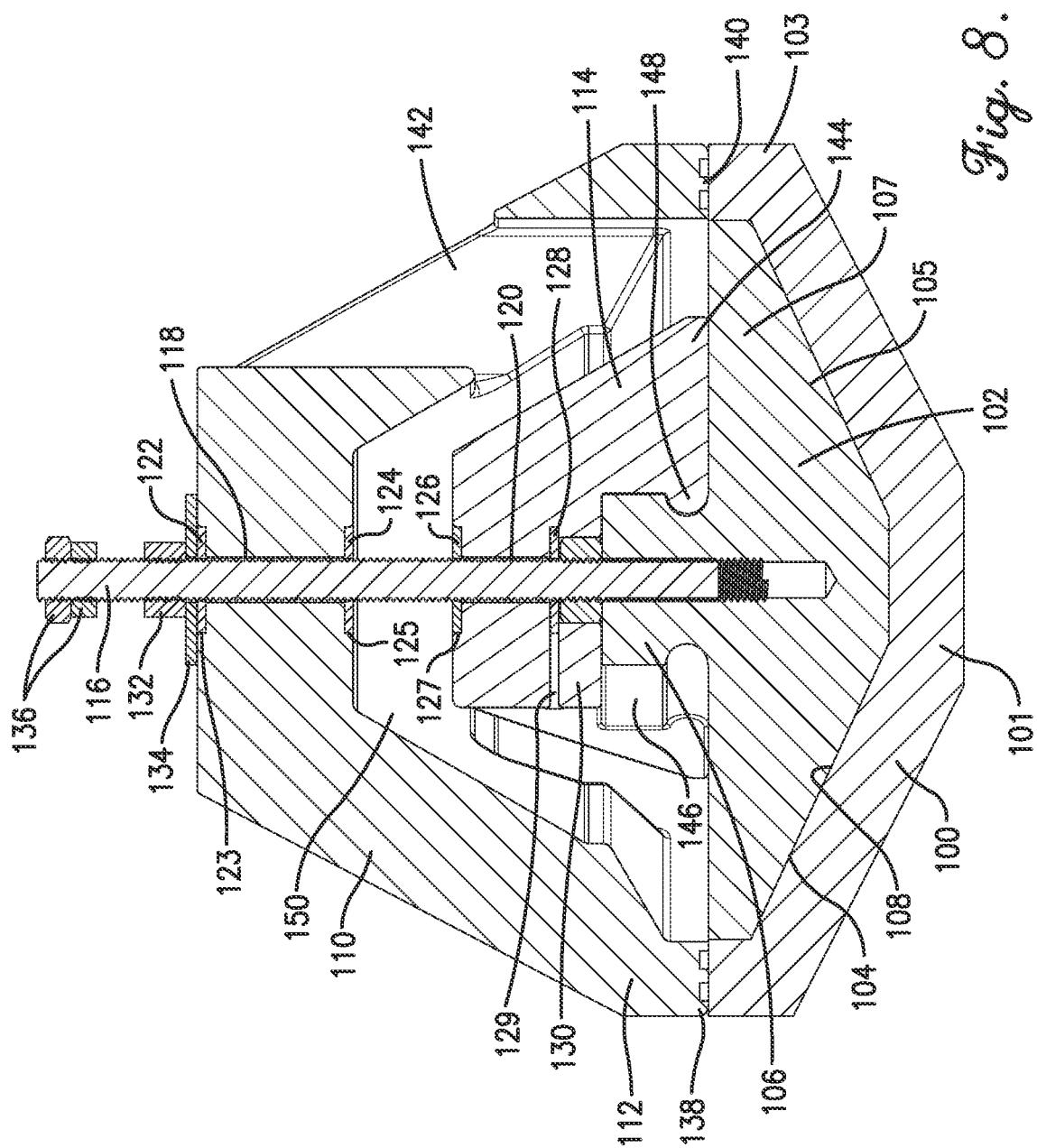

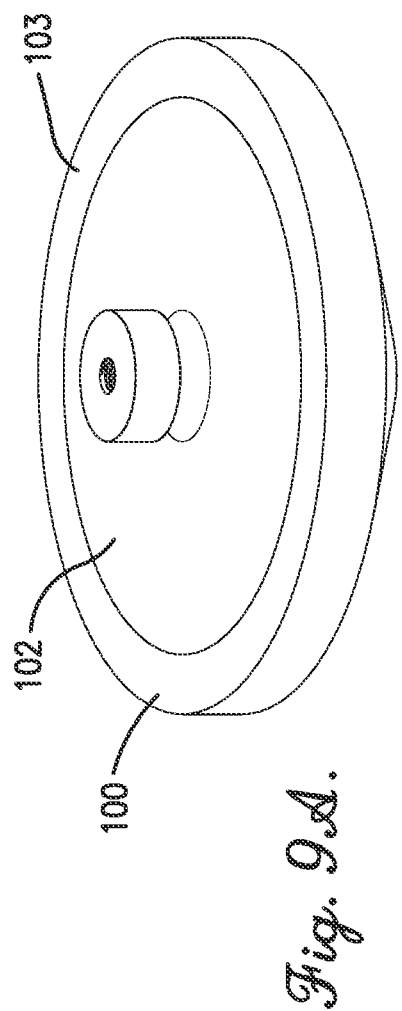
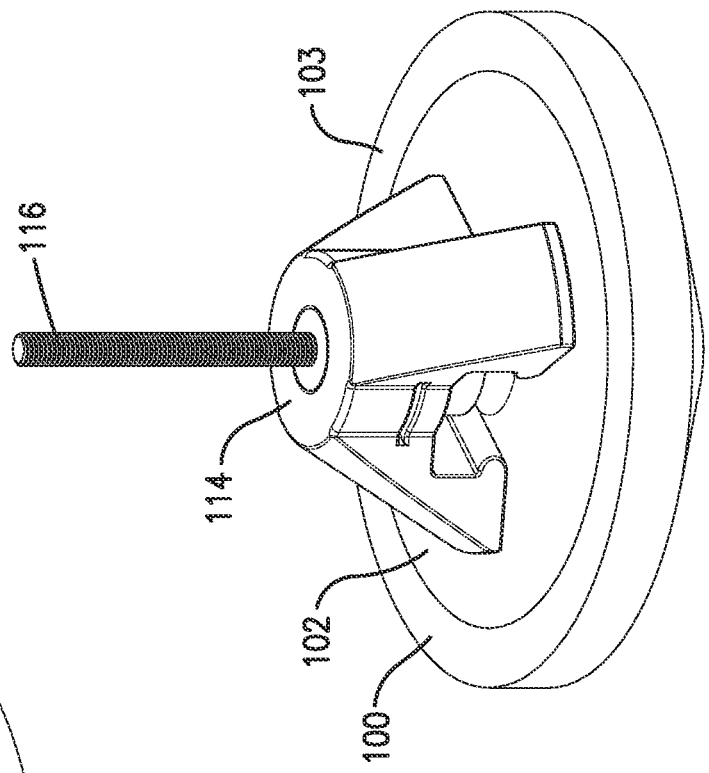
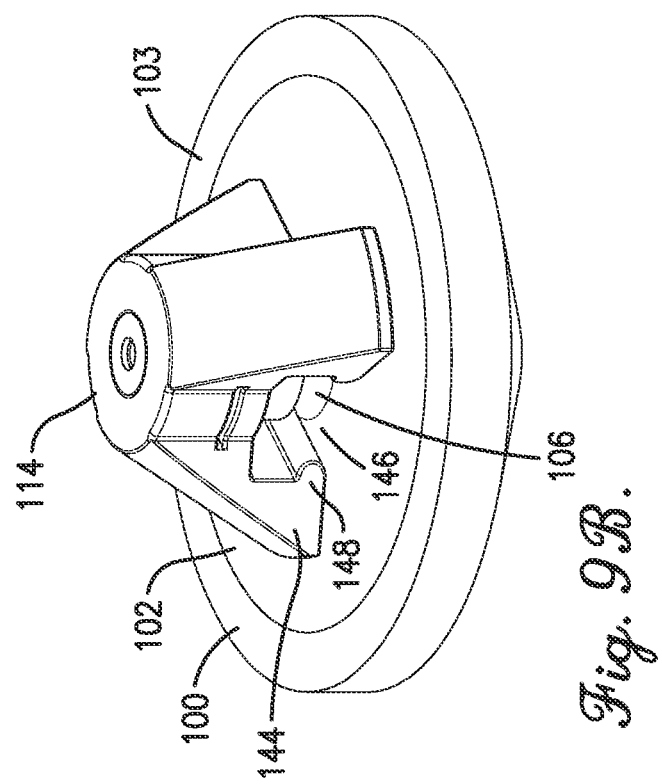

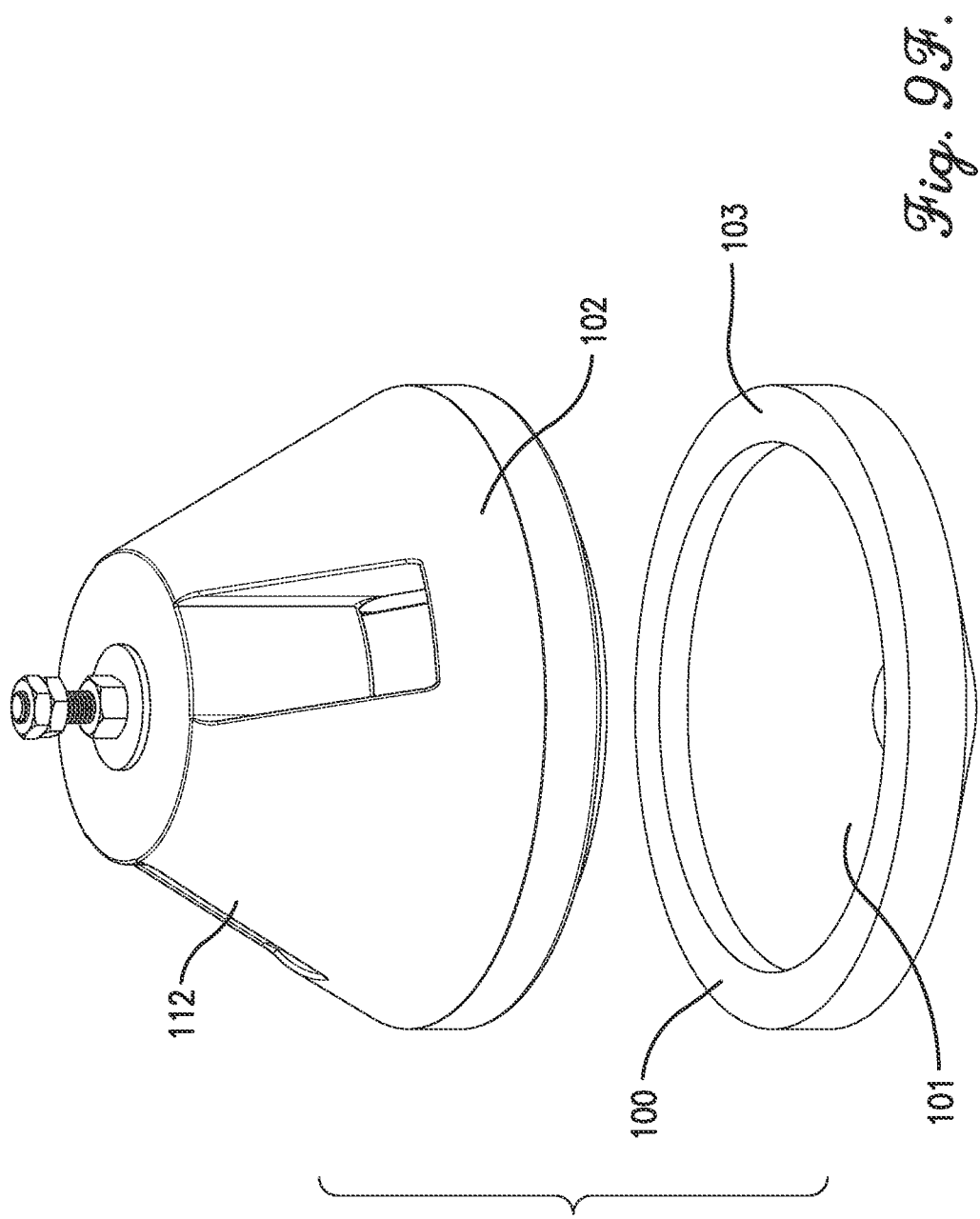

MOLD EXTRACTOR

STATEMENT REGARDING FEDERALLY-SPONSORED RESEARCH OR DEVELOPMENT

This invention was made with Government support under Contract No.: DE-NA0002839 awarded by the United States Department of Energy/National Nuclear Security Administration. The Government has certain rights in the invention.

BACKGROUND

Various industrial components are manufactured using a variety of molding processes. In a compression molding process, a component is manufactured by flowing a heated or molten plastic, metallic, or similar material in a mold cavity of a first mold portion and covering the molten material with a second mold portion. Pressure and/or heat is applied to one or both of the mold portions to force the heated material into contact with all mold surfaces. The pressure and/or heat are maintained until the molten material has cured, at which point the mold portions are separated and the component is extracted.

Depending on the specific geometry of the component being molded, one or more of the mold portions may become stuck or sealed to the component after the component cures. In some instances, this is because the pressure applied during the mold process may form a vacuum seal between a mold portion and the pressed part. This vacuum seal may be difficult to unseat, and in some cases may lead to damage of the component or the mold portion when removing the component from the mold. There thus remains a need for a way to effectively and safely remove a component from a mold portion following a compression molding process or similar manufacturing process.

BRIEF SUMMARY

Embodiments of the disclosure are directed to a mold extractor that can be implemented to remove a mold portion safely and easily from a molded part after a compression molding process or similar, and methods of using such a mold extractor. At a high level, the mold extractor may include a retainer that abuts and secures the molded part in place and that is operatively coupled to a mold holder via an extraction rod or similar. The mold holder may be configured to removably couple to the mold portion and move with respect to the retainer to thereby unseat the mold portion from the molded part without damage to the part.

For example, some embodiments are directed to a mold extractor for separating a molded part from a mold portion following a molding process. The mold extractor comprises a mold holder configured to removably couple to the mold portion, a retainer configured to abut a portion of the molded part, the retainer substantially surrounding the mold holder such that a cavity is provided between the mold holder and the retainer, and an extraction rod engaged with the mold holder and the retainer and spanning the cavity between the mold holder and the retainer. The mold extractor is configured to reduce a distance between the mold holder and the retainer along the extraction rod such that the mold holder translates into the cavity and imparts a force on the mold portion sufficient to extract the mold portion from the molded part.

Other embodiments are directed to a method of separating a molded part from a mold portion following a molding process. The method comprises engaging the mold portion with a mold holder, placing a retainer around the mold holder such that it substantially surrounds the mold holder and abuts a portion of the molded part, the placing the retainer around the mold holder including extending an extraction rod between the mold holder and the retainer such that the extraction rod spans a cavity between the retainer and the mold holder, and reducing a distance between the mold holder and the retainer along the extraction rod such that the mold holder translates into the cavity and imparts a force on the mold portion sufficient to extract the mold portion from the molded part.

These and other features will be discussed in more detail below in connection with the accompanying drawings.

BRIEF DESCRIPTION OF THE DRAWINGS

Embodiments of the disclosure are described in detail below with reference to the attached drawing figures, wherein:

FIG. 1 is a perspective view of a pressed part coupled to a mold portion following a compression molding process or similar;

FIG. 5 is a perspective view the pressed part and the mold portion with the mold extractor coupled thereto as shown in FIG. 3, but with the pressed part retainer shown in FIG. 4 removed in order to illustrate the internal components of the mold extractor;

FIG. 6 is a top view of the pressed part and the mold portion with the mold extractor coupled thereto shown in FIG. 3;

FIG. 7 is a first cross-sectional view of the pressed part and the mold portion with the mold extractor coupled thereto as viewed along line 7-7 in FIG. 6;

FIG. 8 is a second cross-sectional view of the pressed part and the mold portion with the mold extractor coupled thereto as viewed along line 8-8 in FIG. 6; and FIGS. 9A-9F schematically show various steps used to extract the mold portion from the pressed part using the mold extractor shown in FIGS. 3-8.

DETAILED DESCRIPTION

The following detailed description references the accompanying drawings that illustrate specific embodiments of the disclosure. The embodiments are intended to describe aspects of the disclosure in sufficient detail to enable those skilled in the art to practice the various embodiments. Other embodiments can be utilized, and changes can be made without departing from the scope of the disclosure. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the current technology can include a variety of combinations and/or integrations of the embodiments described herein.

Generally, aspects of the disclosure are directed to mold extractor for removing a mold portion from a component following a molding process of the component. The mold extractor may be particularly useful for compression molding processes, in which a portion of the mold can become vacuum sealed to the pressed part, thereby making it difficult to separate the mold portion from the pressed part without damaging the part. However, embodiments are not limited to use in connection with compression molding processes and can be implemented in any process in which a mold or similar needs to be extracted from a component during a manufacturing process.

In some embodiments, the mold extractor may include a pressed part retainer operatively coupled to a mold holder via an extraction rod or similar. During use, the pressed part retainer is configured to hold the pressed part in place while the mold holder, which engages the mold portion, moves closer to the retainer, thereby imparting a force on the mold portion, unseating the vacuum seal, and pulling the mold portion apart from the pressed part. The mold extractor thereby easily and quickly removes the mold portion with little chance of damaging the pressed part or the mold portion. These and other features will become more apparent in connection with the description of the various figures.

Figure 1:
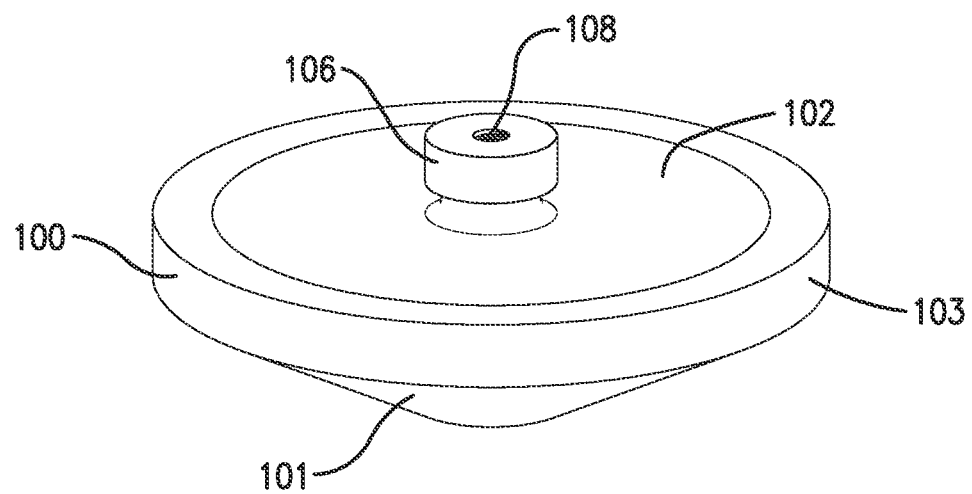
Figure 2:
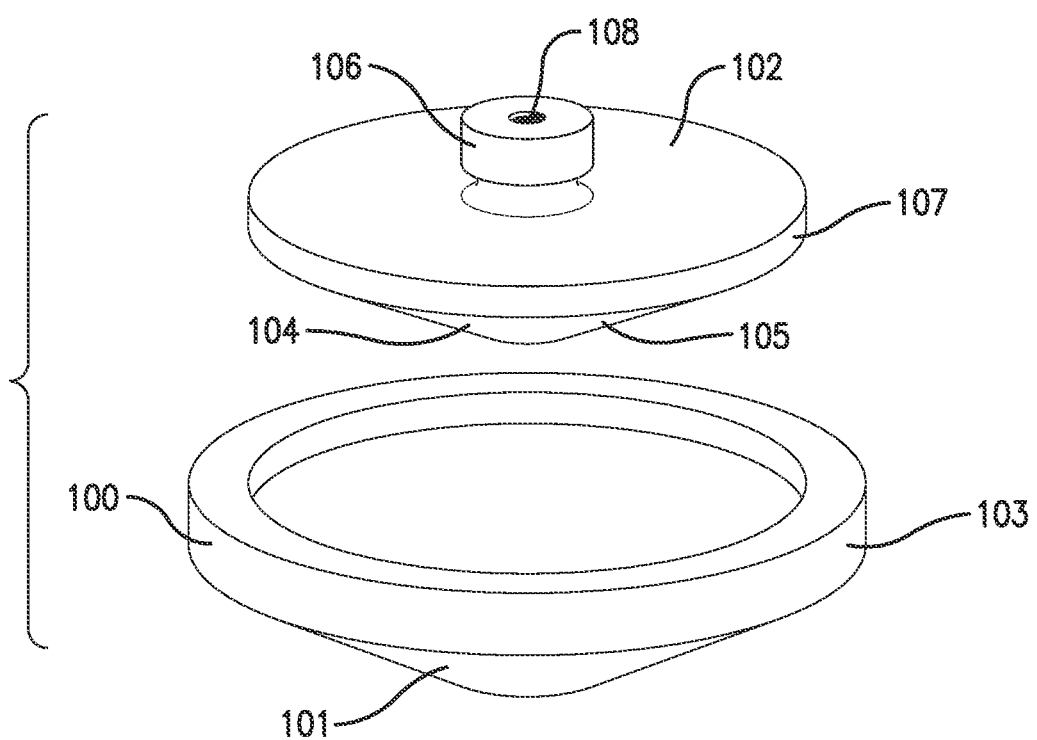
FIG. 2 is a perspective view of the pressed part and the mold portion shown in FIG. 1, but separated following an extraction process according to some embodiments of the disclosure.

First, FIGS. 1 and 2 show a pressed part 100 and a mold portion 102, with FIG. 1 showing the pressed part 100 coupled to the mold portion 102 following a compression molding process or similar, and FIG. 2 showing the pressed part 100 separated from the mold portion 102 following an extraction process described below. In this embodiment, the pressed portion 102 generally includes a frustoconical shell portion 101 (i.e., a portion that is generally frustoconically shaped but hollow) and an annular portion 103. However, embodiments of the disclosure are not so limited, and the mold extractor and mold extraction processes described herein could be used with a variety of alternatively shaped pressed parts.

To form the pressed part 100 using a compression molding process or similar, a first, or bottom, mold portion (not shown) will be provided having a cavity mirroring the outer contour of the pressed part 100. The cavity will be filled with heated and/or molten material, such as a flowable plastic or metallic material, and then the second, or top, mold portion 102 will be moved towards the first mold portion, pressing the molding material therebetween. As best seen in FIG. 2, the mold portion 102 has an outer contour mirroring the inner contour of the pressed part 100, thereby forming the hollow interior of the pressed part 100 during the molding process. More particularly, the mold portion 102 includes a frustoconical portion 105 and a cylindrical portion 107, which will form the inner contours of the frustoconical shell portion 101 and the annular portion 103, respectively.

The mold portion 102 may include other features such as, e.g., an engagement portion 106 having a receiving hole 108 along a central axis thereof. The engagement portion 106 and/or the receiving hole 108 may be used for attaching the mold portion 102 to a molding apparatus (not shown), and/or, as will be more fully discussed, for coupling the mold portion 102 to a mold extractor 110 following the molding process. Again, embodiments of the disclosure could be implemented in connection with alternatively shaped pressed parts, and thus in other embodiments the mold portion 102 will be similarly alternatively sized and shaped without departing from the scope of the disclosure. The mold portion 102 can be constructed from any suitable material and, in one non-limiting example, is constructed from graphite for use in high temperature applications.

Due to the geometry of the generally frustoconical pressed part 100, following the compression molding or similar process the bottom mold portion may easily separate from the outer surface of the pressed part 100, however the top mold portion 102 may be more difficult to remove. That is, because the top mold portion 102 is received within the hollow interior of the pressed part 100, the mold portion 102 and the pressed part 100 may form a vacuum-like seal during the molding process. Thus, the pressed part 100 and the mold portion 102 may become stuck in the orientation shown in FIG. 1. Embodiments of the disclosure are directed to a mold extractor 110 and a process of using such an extractor 110 that can easily and safely unseat the vacuum-like seal, thereby separating the pressed part 100 from the mold portion 102, as shown in FIG. 2. For example, in embodiments in which the mold portion 102 is constructed from graphite, the mold portion 102 may be relatively brittle. The mold extractor 110 described herein can thus properly support the mold portion 102 to reduce the likelihood of cracking or otherwise damaging the mold portion 102 during an extraction process.

Figure 3:
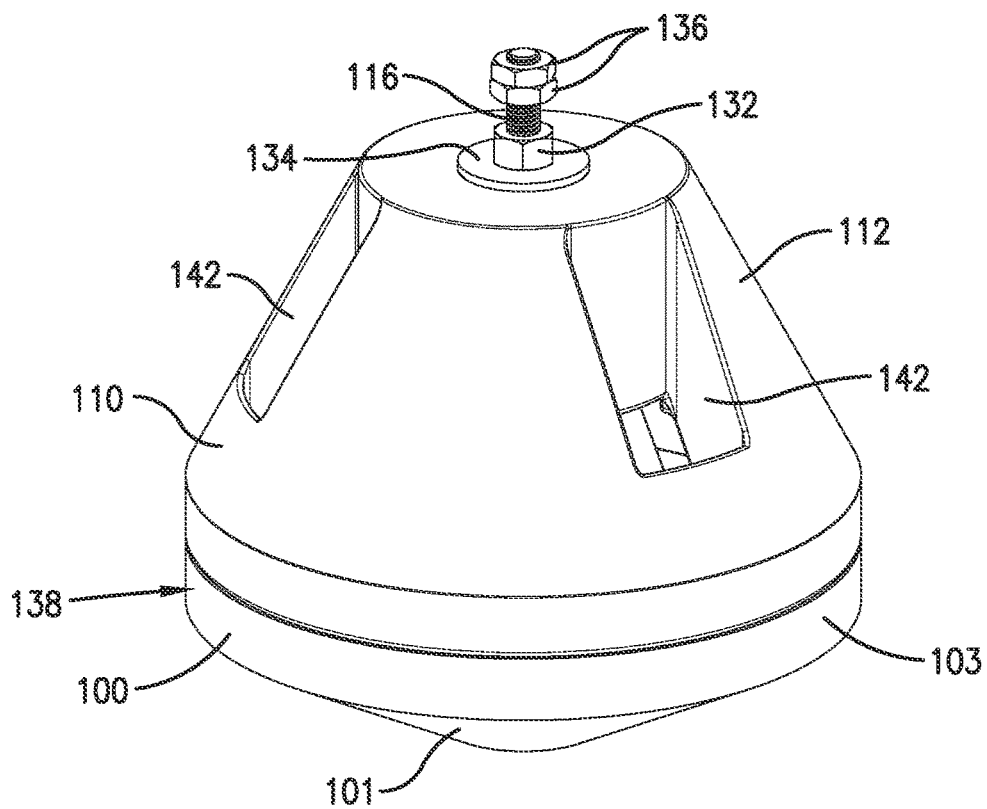
FIG. 3 is a perspective view of the pressed part and the mold portion shown in FIG. 1 with a mold extractor coupled thereto according to some embodiments of the disclosure.
Figure 4:
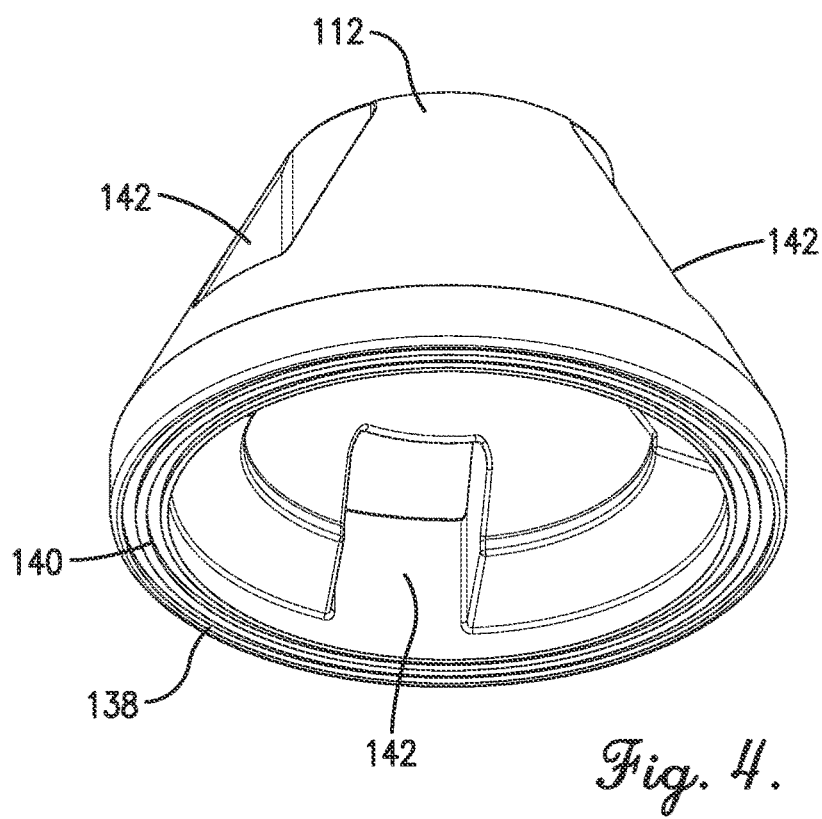
FIG. 4 is a perspective view of a pressed part retainer of the mold extractor shown in FIG. 3.

FIGS. 3-8 show various views of the mold extractor 110 and portions thereof according to embodiments of the disclosure. At a high level, the mold extractor 110 includes a pressed part retainer 112 generally surrounding, but separated from, a mold holder 114. The pressed part retainer 112 is best seen in FIGS. 3 and 4, while the mold holder 114 can be seen in FIG. 5, in which the pressed part retainer 112 is removed for clarity. The pressed part retainer 112 is operatively coupled to the mold holder 114 via an extraction rod 116, which, in the depicted embodiment, is a threaded rod. More particularly, and as best seen in the cross-sectional views shown in FIGS. 7 and 8, the extraction rod 116 extends between the pressed part retainer 112 and the mold holder 114 and is received within a through hole 118, 120 of each, respectively.

The pressed part retainer 112 has a generally frustoconical shell shaped configuration, with a rim 138 thereof having approximately the same size and cross-sectional shape as the annular portion 103 of the pressed part 100. The pressed part retainer 112 can be constructed from any suitable material and, in some embodiments, is constructed from a plastic or metallic material. Moreover, the pressed part retainer 112 can be constructed using any suitable means and, in some embodiments, the pressed part retainer 112 is constructed using additive manufacturing or a similar process. For example, in some embodiments the pressed part retainer 112 is 3D printed and made of acrylonitrile butadiene styrene (ABS).

In some embodiments, the pressed part retainer 112 may include a seal such as a plurality of O-rings 140 or similar seated in a corresponding plurality of circumferentially extending slots provided in the rim 138. As will be discussed more fully below, the O-rings 140 will face the pressed part 100 and abut the annular portion 103 thereof during the extraction process in a cushioning manner. The O-rings 140 may be any desired material and in some embodiments may be a pliable material such as rubber or similar in order to provide a layer of cushioning between the rim 138 and the annular portion 103 to reduce the likelihood of damage to the pressed part 100 during the extraction process.

The pressed part retainer 112 may further include one or more cutouts 142 extending through the outer shell of the retainer 112. For example, in the depicted embodiment the pressed part retainer 112 includes three cutouts 142 spaced equidistantly from each other in the circumferential direction, but in other embodiments the pressed part retainer 112 may include more or less cutouts 142 without departing from the scope of the disclosure. For example, in other embodiments the pressed part retainer 112 could include none, one, two, four, or more than four cutouts 142. When equipped, the cutouts 142 beneficially reduce the amount of material needed to manufacture the pressed part retainer 112 and also provide one or more windows in order to view the mold holder 114 and other internal portions of the mold extractor 110 during use.

As best seen in FIG. 5, the mold holder 114 generally includes a plurality of legs 144 (in the depicted embodiment, three, although more or less could be employed without departing from the scope of the disclosure) extending generally outward and downward from a substantially cylindrical main body 145. The mold holder 114 may further include an opening 146 provided generally between neighboring ones of the legs 144. The opening 146 is sized and shaped to receive, laterally (i.e., a direction substantially perpendicular to the central axis of the through hole 120 provided in the mold holder 114) a part of the mold portion 102. More particularly, in the depicted embodiment the opening 146 is sized and shaped such that the mold holder 114 can slide, laterally, onto the engagement portion 106 of the mold portion 102. Each leg 144, in turn, may include one or more protrusions 148 at a distal, inner side thereof, which removably couple the mold holder 114 to the mold portion 102. More particularly, each protrusion 148 fits underneath a lip of the engagement portion 106 and thus engages the engagement portion 106 during use, which will be more fully discussed below. As with the pressed part retainer 112, the mold holder 114 can be constructed from any suitable material and, in some embodiments, is constructed from a plastic or metallic material. Moreover, the mold portion 114 can be constructed using any suitable means and, in some embodiments, the mold portion 114 is constructed using additive manufacturing or a similar process. For example, in some embodiments the mold holder 114 is 3D printed and made of ABS.

In some embodiments, the mold extractor 110 may include one or more reinforcing members, particularly when the portions thereof are constructed from a non-metallic material such as ABS or similar. In one non-limiting example, the mold extractor 110 may include a plurality of washers 122, 124, 126, and 128 placed along a central axis thereof to provide reinforcement to the various components such as the pressed part retainer 112 and the mold holder 114 during use. More particularly, the pressed part retainer 112 may include a first washer 122 surrounding a top opening of the retainer through hole 118 and a second washer 124 surrounding a bottom opening of the retainer through hole 118. The mold holder may include a third washer 126 surrounding a top opening of the mold holder through hole 120, and a fourth washer 128 surrounding a bottom opening of the mold holder through hole 120.

The washers 122, 124, 126, 128 may be held in place using any desired means such as by an adhesive or otherwise. In one non-limiting example, portions of the mold extractor 110 include a recess, trough, slot, or similar cutout sized and shaped to frictionally receive a reinforcing member such as one of the washers 122, 124, 126, 128 therein. Namely, the pressed part retainer includes a first recess 123 and a second recess 125 configured to receive the first washer 122 and the second washer 124, respectively. The mold holder 114 includes the third recess 127 and a slot 129 configured to receive the third washer 126 and the fourth washer 128, respectively. The washers 122, 124, 126, 128 may be secured in the respective recess 123, 125, 127 and/or slot 129 using any desired means. In one non-limiting example, the first, second, and third recesses 123, 125, 127 and the slot 129 are configured to have a clearance fit with the first, second, third, and fourth washers 122, 124, 126, 128 respectively, such that the washers 122, 124, 126, 128 are pressed into the respective recesses 123, 125, 127 or slot 129 and frictionally held therein.

Finally, the mold extractor includes a plurality of extraction rod engagement members used to move the mold holder 114 towards the pressed part retainer 112 during an extraction process, thereby imparting a force on the mold portion 102 and thus dislodging it from the pressed part 100. For example, in embodiments in which the extraction rod 116 is a threaded rod or similar, the extraction rod engagement members may be a plurality of nuts tapped and threaded such that they can be threaded onto the extraction rod 116. In one non-limiting example, the mold extractor 110 may include one or more tightening nuts 130, one or more extraction nuts 132, and one or more locking nuts 136. The tightening nut 130 is disposed within the mold holder 114 and, more particularly, within a corresponding shaped channel, recess, or similar configured to hold the tightening nut 130 securely in place during use. The extraction nut 132 is threaded onto the extraction rod 116 above the pressed part retainer 112 and snugly to a top surface thereof. Optionally, an additional reinforcement member such as an oversized washer 134 or similar may be placed between the extraction nut 132 and the pressed part retainer to absorb some of the force imparted on the mold extractor 110 during use and thus reduce the change of cracking or premature failure. Finally, the locking nuts 136 are threaded onto the extraction rod 116 above the extraction nut 132 and are used to hold the extraction rod 116 in place (i.e., keep the rod 116 from rotating) during use.

When oriented in this manner, the mold portion 102 can be extracted from the pressed part 100 simply by tightening, with respect to one another (i.e., moving closer to one another), the tightening nut 130 and the extraction nut 132. Doing so reduces the span of the extraction rod 116 that extends between the two nuts 130, 132 thereby pulling the pressed part retainer 112 and mold holder 114 towards one another. However, because the pressed part retainer 112 is braced and anchored against the pressed part 100 via engagement of the rim 138 (and, when equipped, the O-rings 140 or other seal) against the annular portion 103 of the pressed part and thus itself cannot translate, the mold holder 114 translates along the extraction rod 116 as the span between the tightening nut 130 and the extraction nut 132 is reduced. The mold holder 114, in turn, imparts a pulling force on the mold portion 102 via the engagement of the molder holder 114 with the engagement portion 106 of the mold portion 102, and, more particularly, via the engagement of the protrusions 148 of the legs 144 of the mold holder 114 with the lip of the engagement portion 106. This upward, or pulling, force unseats the vacuum seal formed between the mold portion 102 and the pressed part 100 during the molding process and pops the mold portion 102 free from the pressed part 100, as shown in FIG. 2. Use of the mold extractor 110 in this way reduces the chance that the pressed part 100 or mold portion 102 will become damaged during the extraction process.

The process of extracting the mold portion 102 using the mold extractor 110 will be more readily understood with reference to FIGS. 9A-9F, which shows the various steps used to place the mold extractor 110 on the mold portion 102 and extract the mold portion 102 from the pressed part 100. First, at the step shown in FIG. 9A, a pressed part 100 with a mold portion 102 coupled thereto (i.e., vacuum sealed thereto) is provided. Again, in this embodiment the pressed part 100 includes a generally frustoconical shell having a correspondingly shaped frustoconical mold portion 102 adhered to an internal cavity thereof, but the process could be used with other sized and shaped pressed parts and/or mold portions without departing from the scope of the disclosure.

At the step depicted in FIG. 9B, the mold holder 114 is removably coupled to the mold portion 102. For example, in embodiments in which the mold holder 114 includes an opening 146 in the side thereof, the mold holder 114 may be laterally slid onto engagement portion 106 of the mold portion 102 such that the protrusions 148 of the legs 144 are disposed below the lip of the engagement portion 106. As should be appreciated, in embodiments in which the mold holder 114 includes the washers 126, 128 and the tightening bolt 130, the washers 126, 128 and bolt 130 may be pressed into or otherwise integral with the mold holder 114 and thus will be placed on the mold portion 102 at this step as well.

Figure 9C:
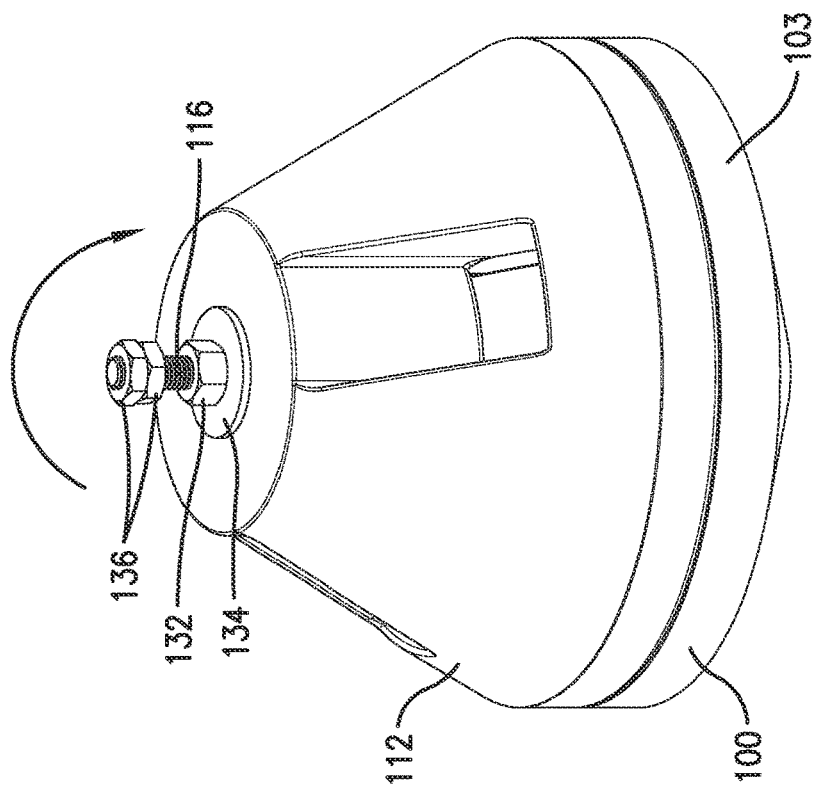

At the step depicted in FIG. 9C, the extraction rod 116 is placed in the mold holder 114 and, in some embodiments, the mold portion 102 itself. More particularly, in embodiments in which the extraction rod 116 is a threaded rod, it can be threaded into the tightening nut 130 at this step. Moreover, in some embodiments the mold portion 102 may include a receiving hole 108 along the central axis thereof. Thus, at this step the extraction rod 116 can be threaded to a position in which the distal end of the extraction rod 116 extends into the receiving hole 108, as best seen in FIGS. 7 and 8. In such embodiments, the receiving hole 108 may be sized, tapped, and threaded correspondingly such that the extraction rod 116 can be threaded therein and engage with the threads of the receiving hole 108.

Figure 9D:
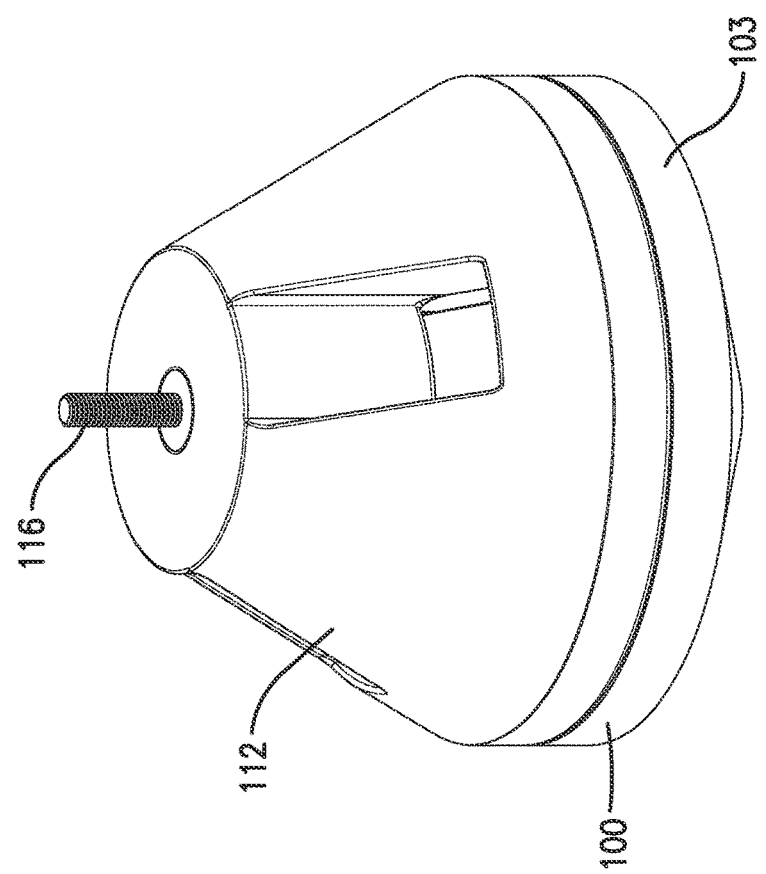

At the step depicted in FIG. 9D, the pressed part retainer 112 is placed on the extraction rod 116 such that it abuts the pressed part 100 and generally surrounds the mold holder 114. More particularly, the pressed part retainer 112 is placed on the extraction rod 116 such that the rod extends through the retainer through hole 118 (and, optionally, any washers 122, 124, if equipped) with the bottom rim 138 of the pressed part retainer 112 abutting the pressed part 100. In embodiments in which the pressed part retainer 112 includes O-rings 140 or similar seal on the bottom rim 138, the pressed part retainer 112 is placed on the extraction rod 116 with the O-rings 140 abutting the pressed part 100. As best seen in FIGS. 7 and 8, when in this position there is a cavity 150 formed between the mold portion 114 and the pressed part retainer 112.

At the step depicted in FIG. 9E, the remaining hardware (such as, e.g., the extraction nut 132, the oversized washer 134, and any locking nuts 136) are placed on the extraction rod 116 above the pressed part retainer 112; i.e., on a side of the pressed part retainer 112 opposite to the cavity 150. For example, in the depicted embodiment, the oversized washer 134 is placed around the extraction rod 116 and in such a way that it abuts the top surface of the pressed part retainer 112. The extraction nut 132 is threaded onto the extraction rod 116 until it is snug against the oversized washer 134. And the locking nuts 136 are threaded onto the proximal end of the extraction rod.

The tightening nut 130 and extraction nut 132 are then tightened with respect to one another, thereby reducing the length of the span of the extraction rod 116 extending between the two nuts 130, 134. In this embodiment, a tool (e.g., wrench) can engage one or both of the locking nuts 136, which will hold the extraction rod 116 in place (i.e., prevent the rod 116 from rotating). Another tool (e.g., wrench) can then engage the extraction nut 132, and rotate it as depicted by the arrow in FIG. 9E thereby tightening the nut 132 with respect to the tightening nut 130 and thus reducing the length of the span of the extraction rod 116 extending between the two nuts 130, 132. Because the pressed part retainer 112 is immobile (i.e., it is anchored against the pressed part 110 via the O-rings 140 or other seal on the rim 138 engaging the annular portion 103 of the pressed part 100), the mold holder 114 will translate toward the pressed part retainer 112 as the extraction nut 132 turns. Put another way, the mold holder 112 will translate along the extraction rod 116 into the cavity 150 provided between the pressed part retainer 112 and the mold holder 114 in response to the reduction in span of the extraction rod 116 extending between the tightening nut 130 and the extraction nut 132. As the mold holder 114 translates, the mold holder 114 will impart an upward or pulling force on the mold portion 102 via the protrusions 148 of the legs 144 engaging with the lip of the engagement portion 106 and/or via the threads of the extraction rod 116 engaging with the threads of the receiving hold 108.

At the step depicted in FIG. 9F, the mold portion 102 is freed from the pressed part 100 as a result of the mold extractor 110 breaking the vacuum seal or other seal formed between the mold portion 102 and the pressed part 100 during the molding process. More particularly, the extraction nut 132 is continually tightened until the mold portion 102 pops free of the pressed part 100. Such a process beneficially frees the mold portion 102 from the pressed part 100 without the need to dig at the interface of the mold portion 102 and the pressed part 100 with a tool or similar, thereby reducing the likelihood of damaging the pressed part 100 or the mold portion 102. Following removal, the mold portion 102 can be removed from the mold holder 114 to thereafter be reused in a compression molding process by essentially performing the steps shown in FIGS. 9A-9E in reverse. That is, the mold portion 102 can be removed from the mold holder 114 by removing the lock nuts 136, removing the extraction nut 132 and oversized washer 134, lifting off the pressed part retainer 112, unthreading the extraction rod from the mold portion 102 and, optionally, from the tightening nut 130, and sliding the engagement portion 106 of the mold portion 102 out of the mold holder 114 via the opening 146 provided therein.

Although various aspects of the disclosure have been described with reference to the embodiments illustrated in the attached drawings, it is noted that equivalents may be employed without departing from the scope of the invention as recited in the claims.

The invention claimed is:

1. A mold extractor for separating a molded part from a mold portion following a molding process, the mold extractor comprising:
   a mold holder configured to removably couple to a mold portion;
   a retainer configured to abut a portion of the molded part, the retainer substantially surrounding the mold holder such that a cavity is provided between the mold holder and the retainer, wherein the retainer includes a plurality of cutouts, each cutout extending from an outer surface of the retainer to the cavity; and an extraction rod engaged with the mold holder and the retainer and spanning the cavity between the mold holder and the retainer, wherein the mold extractor is configured to reduce a distance between the mold holder and the retainer along the extraction rod such that the mold holder translates into the cavity and imparts a force on the mold portion sufficient to extract the mold portion from the molded part.

2. The mold extractor of claim 1, wherein the mold holder includes a plurality of legs, wherein each of the plurality of legs is configured to engage the mold portion and impart a force thereon as the mold holder translates into the cavity.

3. The mold extractor of claim 2, wherein the mold holder further includes an opening provided between two adjacent legs of the plurality of legs, and wherein the mold holder is configured to removably couple to the mold portion by sliding the mold portion into the opening.

4. The mold extractor of claim 1, wherein the retainer includes a rim configured to engage a portion of the molded part during use of the mold extractor.

5. The mold extractor of claim 4, wherein the rim of the retainer includes a seal configured to abut the portion of the molded part during use of the mold extractor.

6. The mold extractor of claim 1, wherein the extraction rod is an at least partially threaded rod.

7. The mold extractor of claim 6, wherein the mold holder integrally includes a first nut threaded onto the at least partially threaded rod.

8. The mold extractor of claim 7 further comprising a second nut threaded onto the at least partially threaded rod on a side of the retainer opposite to the cavity, wherein mold extractor is configured reduce the distance between the mold holder and the retainer by tightening the first nut with respect to the second nut.

9. The mold extractor of claim 8 further comprising one or more third nuts, wherein the one or more third nuts are configured to engage the at least partially threaded rod and prevent it from rotating when tightening the first nut with respect to the second nut.

10. A method of separating a molded part from a mold portion following a molding process, the method comprising:

engaging the mold portion with a mold holder;

placing a retainer around the mold holder such that it substantially surrounds the mold holder and abuts a portion of the molded part, the placing the retainer around the mold holder including extending an extraction rod between the mold holder and the retainer such that the extraction rod spans a cavity between the retainer and the mold holder, wherein the placing of the retainer around the mold holder includes engaging a portion of molded part with a rim of the retainer, abutting the portion of the molded part with a seal provided on the rim of the retainer; and reducing a distance between the mold holder and the retainer along the extraction rod such that the mold holder translates into the cavity and imparts a force on the mold portion sufficient to extract the mold portion from the molded part.

11. The method of claim 10, wherein the engaging the mold portion with the mold holder includes surrounding the mold portion with a plurality of legs of the mold holder.

12. The method of claim 11, wherein the engaging the mold portion with the mold holder further includes sliding the mold portion into the mold holder via an opening provided between two adjacent legs of the plurality of legs.

13. The method of claim 10, wherein the extraction rod is an at least partially threaded rod, and wherein the extending the extraction rod between the mold holder and the retainer includes threading the at least partially threaded rod into a first nut coupled to the mold holder.

14. The method of claim 13, wherein the extending the extraction rod between the mold holder and the retainer further includes threading a second nut onto the at least partially threaded rod on a side of retainer opposite to the cavity, wherein the reducing the distance between the mold holder and the retainer along the extraction rod includes tightening the second nut with respect to the first nut.

15. The method of claim 14 further comprising tightening the second nut with respect to the first nut until a vacuum seal between the molded part and the mold portion is broken.

16. The method of claim 13 further comprising threading one or more third nuts onto an end of the at least partially threaded rod opposite to an end of the at least partially threaded rod disposed nearest to the mold holder.

17. The method of claim 16, wherein the reducing the distance between the mold holder and the retainer along the extraction rod includes holding the one or more third nuts stationary while rotating the second nut.

18. A mold extractor for separating a molded part from a mold portion following a molding process, the mold extractor comprising:

a mold holder configured to removably couple to a mold portion;

a retainer configured to abut a portion of the molded part, the retainer substantially surrounding the mold holder such that a cavity is provided between the mold holder and the retainer, wherein the retainer includes a rim configured to engage a portion of the molded part during use of the mold extractor, wherein the rim of the retainer includes a seal configured to abut the portion of the molded part during use of the mold extractor; and an extraction rod engaged with the mold holder and the retainer and spanning the cavity between the mold holder and the retainer, wherein the mold extractor is configured to reduce a distance between the mold holder and the retainer along the extraction rod such that the mold holder translates into the cavity and imparts a force on the mold portion sufficient to extract the mold portion from the molded part.

* * * * *